US007065557B2

(12) United States Patent
Sowden et al.

(10) Patent No.: US 7,065,557 B2
(45) Date of Patent: Jun. 20, 2006

(54) METHOD AND APPARATUS FOR CONSUMING CONTENT AT A NETWORK ADDRESS

(75) Inventors: Anthony Sowden, Bristol (GB); James John Girard, Portland, OR (US); Christine Ching-Hui Chuang, Alhambra, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 09/833,056

(22) Filed: Apr. 12, 2001

(65) Prior Publication Data

US 2002/0149559 A1    Oct. 17, 2002

(51) Int. Cl.
    *G06F 15/16* (2006.01)
(52) U.S. Cl. .................. 709/217; 709/203; 709/227; 709/229; 709/250
(58) Field of Classification Search ........ 709/225–229, 709/222, 200–203, 217–219, 250
    See application file for complete search history.

(56) References Cited

U.S. PATENT DOCUMENTS

| 5,497,411 | A | * | 3/1996 | Pellerin | 455/411 |
|---|---|---|---|---|---|
| 5,812,795 | A | * | 9/1998 | Horovitz et al. | 709/245 |
| 5,847,698 | A | * | 12/1998 | Reavey et al. | 345/173 |
| 5,956,034 | A | * | 9/1999 | Sachs et al. | 345/776 |
| 6,023,268 | A | * | 2/2000 | Britt et al. | 709/203 |
| 6,081,629 | A | * | 6/2000 | Browning | 382/313 |
| 6,138,072 | A | * | 10/2000 | Nagai | 701/207 |
| 6,163,779 | A | * | 12/2000 | Mantha et al. | 707/100 |
| 6,229,990 | B1 | * | 5/2001 | Toshida | 455/69 |
| 6,230,319 | B1 | * | 5/2001 | Britt et al. | 717/173 |
| 6,320,591 | B1 | * | 11/2001 | Griencewic | 345/582 |
| 6,328,570 | B1 | * | 12/2001 | Ng | 434/307 A |
| 6,331,865 | B1 | * | 12/2001 | Sachs et al. | 345/776 |
| 6,345,764 | B1 | * | 2/2002 | Knowles | 235/472.01 |
| 6,349,337 | B1 | * | 2/2002 | Parsons | 709/227 |
| 6,487,663 | B1 | * | 11/2002 | Jaisimha et al. | 713/193 |
| 6,493,734 | B1 | * | 12/2002 | Sachs et al. | 715/526 |

(Continued)

*Primary Examiner*—Bharat Barot

(57) ABSTRACT

User interface apparatus (1) comprising electronic user interface device (2) and storage device (3), the electronic user interface device being operative to convey information to a user, the information being derived from a resource which is remote from the user interface device, the storage device being portable and interfaceable with said user interface device and the arrangement being such that in use whilst the storage device is interfaced with the user interface device, the storage device stores a reference to the resource so that the user may access that resource at a subsequent time.

The electronic user interface could be a viewer comprising a screen. So, a user could read the text of a piece of literature which is accessed from an Internet resource by way of a URL. If the user wishes to discontinue reading, the reference of that part of the text where he discontinued reading is stored on the storage device. Thus when he desires to continue reading the text at a subsequent time, insertion of the storage device into the user interface will allow him to continue from where he finished.

The inventive apparatus (1) could be configured to allow the user to store any references in the subject matter being accessed and not only the reference to that part of the resource which was last accessed.

The storage device (3) may advantageously be configured to allow the purchase of resources such as media products accessible via the Internet.

10 Claims, 1 Drawing Sheet

U.S. PATENT DOCUMENTS

| | | | |
|---|---|---|---|
| 6,515,988 B1 * | 2/2003 | Eldridge et al. | 370/389 |
| 6,553,464 B1 * | 4/2003 | Kamvysselis et al. | 711/148 |
| 6,584,506 B1 * | 6/2003 | Perlman et al. | 709/227 |
| 6,597,314 B1 * | 7/2003 | Beezer et al. | 1/1 |
| 6,618,258 B1 * | 9/2003 | Goris | 361/737 |
| 6,658,247 B1 * | 12/2003 | Saito | 340/7.2 |
| 6,694,335 B1 * | 2/2004 | Hopmann et al. | 709/203 |
| 6,725,258 B1 * | 4/2004 | Bick et al. | 709/219 |
| 6,735,622 B1 * | 5/2004 | Andreoli et al. | 709/219 |
| 6,735,665 B1 * | 5/2004 | Kumagai et al. | 711/101 |

* cited by examiner

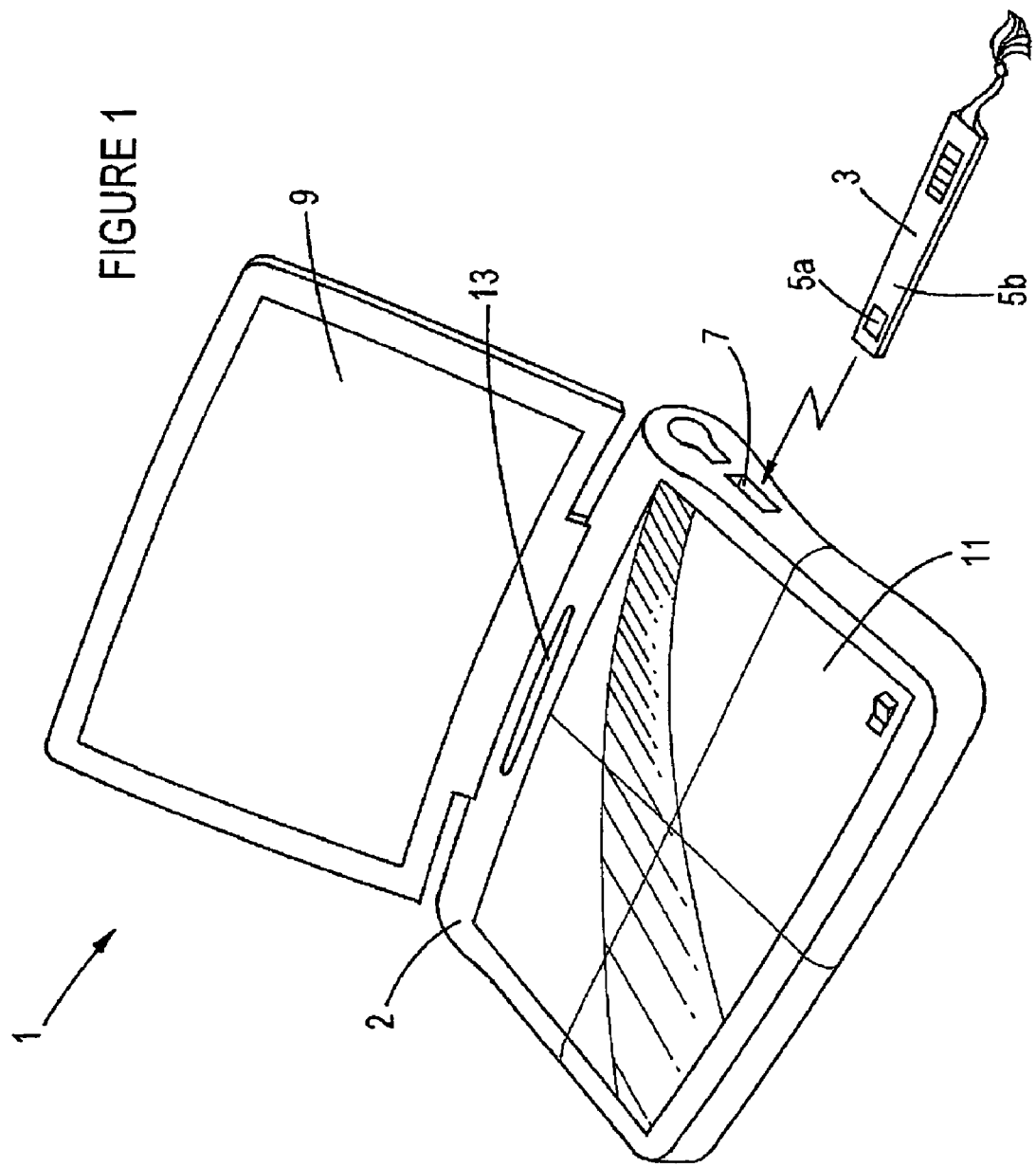

METHOD AND APPARATUS FOR CONSUMING CONTENT AT A NETWORK ADDRESS

The present invention relates to user interface apparatus and in particular to user interface apparatus comprising electronic user interface means and storage means which is interfaceable with said electronic user interface means.

SUMMARY OF THE INVENTION

According to a first aspect of the invention there is provided apparatus comprising electronic user interface means and storage means, the electronic user interface means being operative to convey information to a user, the user interface means comprising a network connection and the information being derived from a resource which is accessible through the network connection, the storage means being portable and interfaceable with said user interface means and the arrangement being such that in use whilst the storage means is interfaced with the user interface means the storage means stores a reference to the resource so that the user may access that resource at a subsequent time.

The term 'electronic user interface means' is used herein to mean any electronic means which is capable of conveying information to a user by way of any particular medium, thus such means may convey information to a user by way of text, sound, graphics, animation or video for example.

The storage means may interface with the electronic user interface by means of electrical contact, capacitive, inductive, radio, optical, magnetic or acoustic coupling for example.

Preferably the storage means stores a reference to part of the resource so that the user may return to that part of the resource at a subsequent time.

Preferably the storage means stores a reference which allows the user to continue access to the resource from that part of the resource which he last accessed at a previous time.

The apparatus may advantageously be configured to accept data input through the user interface means, transmit the input via the network connection to a data storage provider and store a reference on the storage means which enables the stored data input to be located.

The storage means preferably stores a reference to an Internet resource.

The apparatus may be configured such that when the storage means is interfaced with the electronic user interface means the resource to which a stored reference on the storage means corresponds is automatically accessed.

The storage means may store data relating to a parameter of the format of the information conveyed to the user.

The storage means may comprise authentication means which is required to be verified before access to a resource is granted.

According to a second aspect of the invention there is provided portable storage means which stores a reference to a resource, the storage means being interfaceable with electronic user interface means, the storage means comprising a reference to a resource which is accessible through a network connection provided by the user interface means and the storage means comprising authentication means, and the arrangement being such that in use a user may access the resource via the user interface provided the authentication means has been validated.

Preferably the authentication means comprises a digital certificate.

The storage means preferably comprises a reference for an Internet resource.

BRIEF DESCRIPTION OF THE DRAWING

The invention will now be further described, by way of example only, with reference to the accompanying drawing in which:

FIG. 1 shows a schematic drawing of an electronic user interface device and a storage device in accordance with the invention.

DESCRIPTION OF PREFERRED EMBODIMENT

With reference to FIG. 1 there is shown apparatus 1 comprising an electronic user interface device 2 and a storage device 3, the storage device 3 being interfaceable with the electronic user interface device 2.

The user interface device 2 comprises two hinged screens 9 and 11 and a slot 7 and microprocessing circuitry (not shown). The device 2 further comprises a network connection (not shown) which allows the device to connect to a network, for example the Internet.

The storage device 3 is readily portable, of elongate form, and comprises a memory portion 5a which comprises ROM and RAM which is integral with a body portion 5b.

In use the apparatus operates as follows. The storage device 3 is inserted into the port 7 of the user interface device. On doing so electrical contacts on the storage device 3 (not shown) come into register with electrical contacts (not shown) provided inside the port 7.

The ROM of the storage device 3 comprises a reference to a resource which is accessible via the user interface device 2. For example the reference may be a Uniform Resource Locator (URL) for the text of a piece of literature. In that example, on insertion of the storage device 3 the URL is automatically accessed and the user can view the text of that particular piece of literature on either or both of the screens 9 and 11. The user can thus read the text at his leisure by scrolling viewable text.

In the situation that the user wishes to discontinue viewing the text until a later time, he informs the user interface device 2 that he wishes to do this, for example using a stylus 13 to touch the appropriate region on one of the screens. On doing this the reference of that part of the text where he discontinued reading is stored in the memory portion 5a of the storage device 3. Thus when the user desires to continue reading the text at a subsequent time, insertion of the storage device into the user interface device 2 will allow him to continue from where he finished.

The inventive apparatus 1 could be configured to allow the user to store any references in the subject matter being accessed which are deemed to be of importance and not only that part of the resource which was last accessed.

The inventive apparatus 1 may be configured to transmit data inputted through the user interface device to a remote data storage provider (not shown) and to store a reference on the storage device which enables the stored data input to be located. For example a user may enter data, such as text and graphics, into the user interface device 2. The device 2 is then operative to transmit the inputted data via the network connection to the data storage provider which is remote of the device 2 and also to write to the storage device 3 with the reference of the location of the data storage provider. Where the data storage provider is a server accessible via the Internet the user interface device 2 is operative to write the respective URL on the storage device 3. This configuration is particularly advantageous in that it potentially allows a user access to his data from any suitable user interface device. In particular the user does not have the inconvenience of having to carry a device storing his data with him but rather need only carry his data storage device 3, which is compact and lightweight. In such an arrangement the device 3 could be provided with stored digital authentication means (as described below), such as digital certificate and user of the device may further require the user to enter a password or PIN before access to the data storage provider was granted.

A microprocessor could be incorporated into the storage device 3 such that proprietary media resources accessible through the Internet, for example, could be purchased. A user may wish to listen to a particular piece of music using a suitable user interface. The user would purchase a storage device which incorporates a microprocessor and the URL of the music file on the Internet. Using a known challenge/response procedure between the resource provider and the storage device would take place in order to authenticate the storage device before access to the resource was permitted. For such a procedure the storage device would have stored therein a digital certificate which is signed using a private key of the resource provider and the certificate comprising the public key of the storage device. The storage device would also be provided with an identity label in the form of a serial number. Thus, when the device 3 is inserted into the port 7 a request is sent to the resource provider. The resource provider would then respond by generating a random number which is sent to the storage device 3. On receipt of this challenge the processor of the storage device signs the identity label and the random number using the private key of the storage device to produce a so-called digest. The digest and the certificate form the challenge response which is sent to the resource provider. On receipt of the challenge response the public key of the resource provider is applied to the certificate so as to extract the public key of the storage device. The resource provider then uses the public key of the storage device to decrypt the digest and hence the random number and the identity label may be verified. Films and other media products could also be purchased in this manner.

Such a storage device would advantageously provide a piece of physical property which gives the owner the right to access a particular resource.

The storage device could be provided solely with a blank RAM and sold as such so that the user may store references thereon as and when he so desires.

Where the storage device comprises a RAM, the user may store therein data relating to the preferred parameters of the format of the information conveyed to the user from the user interface. For example the storage device may store data so that when text is viewed on a user interface it is in a preferred font, size and layout.

It will be appreciated that the invention would equally find utility in resources available through an intranet.

It will also be appreciated that a user interface device of the invention generally comprises input means, output means, and as such in addition to the device 2 comprising a two screen viewer hereinbefore described may comprise a portable or desktop personal computer or a public access computer terminal.

It will be further appreciated that the storage device need not necessarily comprise a body portion 5b and could alternatively, for example, be a conventional smart card, ie a generally oblong-rectangular substrate to which there is affixed a portion comprising a microprocessor and a memory.

The invention claimed is:

1. A method of reading text located at a network address, comprising the steps of:
   connecting, to a user interface, a portable memory where the network address for the text is stored;
   responding to the connection between the user interface and the portable memory by coupling the text at the network address to the user interface and supplying the coupled text to a user by operating the user interface;
   upon the user navigating the coupled text to a given point in the coupled text, ceasing to read the coupled text;
   causing the user interface to record on the portable memory data indicative of the given point;
   then disconnecting the portable memory from the user interface; and
   subsequently (a) reconnecting the portable memory to a user interface that can read from and write to the portable memory, and (b) using the address and the data indicative of the given point stored on the portable memory to (i) connect to the address and (ii) navigate the user interface directly to the given point of the text.

2. A method according to claim 1, wherein the text is stored on a server accessible via the Internet, and the address is a URL.

3. A method according to claim 1, wherein the portable memory includes a ROM storing the address and a RAM, the responding step including reading the address stored in the ROM, storing the data indicative of the given point in the RAM, and reading the data indicative of the given point from the RAM to navigate to the given point.

4. A method of listening to music located at a network address, comprising the steps of:
   connecting a portable memory where the network address for the music is stored to a user interface;
   responding to the connection between the user interface and the portable memory by coupling the music at the network address to the user interface and supplying, the coupled music to a user by operating the user interface;
   upon the user listening to the coupled music to a given point in the coupled music, ceasing to listen to the coupled music;
   causing the user interface to record on the portable memory data indicative of the given point;
   then disconnecting the portable memory from the user interface, and
   subsequently (a) reconnecting the portable memory to a interface that can read from and write to the portable memory, and (b) using the address and the data indicative of the given point stored on the portable memory to (i) connect to the address and (ii) navigate the user interface directly to the given point of the music.

5. A method according to claim 4, wherein the music is stored on a server accessible via the Internet, and the address is a URL.

6. A method according to claim 4, wherein the portable memory includes a ROM storing the address and a RAM, the responding step including reading the address stored in the ROM, storing the data indicative of the given point in the RAM, and reading the data indicative of the given point from the RAM to navigate to the given point.

7. A method according to claim 1, wherein the connecting and reconnecting steps include inserting the portable memory into a port of the user interface at different times.

8. A method according to claim 4, wherein the connecting and reconnecting steps include inserting the portable memory into a port of the user interface at different times.

9. An apparatus for reading text or listening to music, the apparatus comprising an interface device having a port for receiving a portable memory device storing a network address for the text or music, the portable memory device including a RAM, the interface device including a processor for reading the stored address and coupling the interface device to the stored address and for presenting the text or music at the stored address to the user in response to coupling being established between the interface device and the stored address, the interface device being arranged to:

(a) be responsive to a first input action by the user indicative of the user no longer (i) reading the text or (ii) listening to the music and for deriving a signal indicative of a given point in the text where the user stopped reading the text or a given point in the music where the user stopped listening to the music, (b) supply the signal to the RAM, (c) read the signal from the RAM in response to the user disconnecting the portable memory device from the interface device and re-connecting the portable memory device to the interface device, and (d) then respond to the signal read from the RAM by coupling the interface device to the stored address at the given point in the text or the given point in the music.

10. An apparatus according to claim 9, wherein operation (d) is performed by sending the stored address from the memory device to the interface device.

* * * * *